May 1, 1962 C. W. FRITZE 3,032,246

TAPE GUIDE

Filed Oct. 18, 1957

INVENTOR
CURTIS W. FRITZE

BY Cushman, Darby & Cushman
ATTORNEYS

United States Patent Office 3,032,246
Patented May 1, 1962

3,032,246

TAPE GUIDE

Curtis W. Fritze, St. Paul, Minn., assignor to Sperry Rand Corporation, New York, N.Y., a corporation of Delaware Filed Oct. 18, 1957, Ser. No. 691,057
4 Claims. (Cl. 226—97)

This invention relates to tape handling systems and in particular to apparatus for improving the performance of such a system by reducing the amount of friction and inertia of its moving parts.

In tape handling systems where high speeds and high accelerations and decelerations are a requirement, friction and inertia are the primary factors tending to impede the operation.

In previous tape handling devices, roller type guides are used to route the tape through the system. These rollers with their associated masses, increase the inertia of the system. Also, since the tape is at all times in contact with such roller guides, additional friction is introduced in the system by the tape passing over the rollers and by the rollers revolving about their bearings.

In this invention, the mass of the tape guides may be stationary at all times and therefore add no inertia to the system. Since the tape is caused to ride on a film of air, the friction of the system is considerably reduced since the fluid friction caused by the tape passing over the air film is much less than the friction resulting from the roller type guides.

Accordingly, it is the prime object of this invention to provide an improved tape guide for use in a tape handling system.

Another object of this invention is to provide a tape guide which reduces both the friction and inertia of the device.

A further object of this invention is to provide a tape guide which will maintain a high quality of performance by eliminating any problem caused by wearing of moving parts.

Still another object of the invention is the provision of a film of air between the tape and the tape guide on which the tape rides.

Yet another object of the invention is the provision of means for allowing a tape to move over air in conjunction with means for reducing the air pressure so as to provide improved braking and clutching of the tape.

Still other objects of this invention will become apparent to those of ordinary skill in the art by reference to the following detailed description of the exemplary embodiment of the apparatus and the appended claims. The various features of the exemplary embodiment according to the invention may be best understood with reference to the accompanying drawings, wherein:

Figure 1:
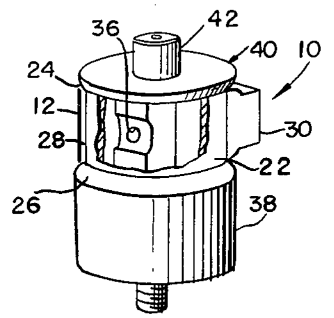
FIGURE 1 illustrates an assembly of a pneumatic tape guide.
Figure 2:
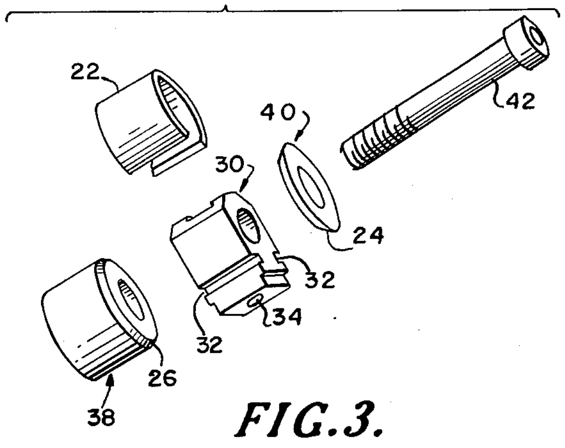
FIGURE 2 is an exploded disassembled view of the tape guide of FIGURE 1.
Figure 3:
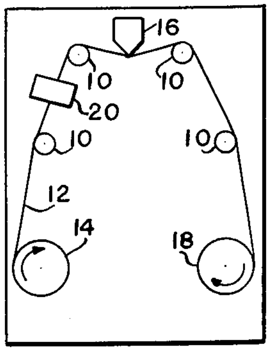
FIGURE 3 illustrates a tape handling system in which the tape guide of FIGURE 1 is employed.

FIGURES 1 and 2 illustrate assembled and disassembled pneumatic operated apparatus which will guide and support a movable record member such as a magnetic tape in a substantially frictionless manner by means of an area source of uniformly pressurized air directed onto the tape or record member. The tape guide 10 as assembled in FIGURE 1 may be employed as shown in FIGURE 3 to allow for frictionless guiding of tape 12 from one direction to another around curves or the like. That is, while tape 12 is being wound from reel 14 past transducer 16 and onto reel 18 by a tape driving mechanism 20, the routing of the tape is such that the direction thereof changes at four different places and the tape guide assemblies 10 are there employed as shown. In addition, an assembly 10 may be utilized, if desired, where no change in the direction of tape is intended.

As above indicated, normally tape handling systems employ roller type tape guides to route the tape through the system. Such roller guides are in contact with the tape and consequently a certain amount of friction or drag is introduced into the system as well as inertia due to the rollers.

To obviate such friction and inertia, tape 12 of FIGURE 3 is directed over an air pervious porous shroud 22 as shown in FIGURE 1 between tape edge guides such as beveled shoulders 24 and 26. For purposes of maintaining the tape away from the shroud so that the tape will rest or move over a film or cushion of air formed in the space 28 between the tape and the shroud 22, the shroud partially surrounds an air header 30 with the ends of shroud 22 respectively fitting in grooves 32. Pressurized air may be introduced internally of header 30 by inlet opening 34 in the exterior end of the header and can exit from the header at its opposite end via aperture 36 which communicates through the header with inlet opening 34. A differently located air outlet or several outlets may be employed as long as it or they will direct air onto the interior surface of shroud 22. After leaving aperture 36, the air although somewhat pointed, impinges on the shroud 22 and spreads over the entire interior surface thereof because of the partial resistance of the shroud to air. That is, even though shroud 22 is porous, and consequently pervious to air, it has a certain amount of immediate resistance to air so as to cause even distribution of the pressurized air on the interior surface of the shroud. In this manner, the porous shroud 22 exudes the air from each of its minute external surface areas (pores or orifices) with equal pressure so that the exuded air may be considered as having a uniform pressure distribution.

Header 30, with its shroud 22, is assembled with its top and bottom sides contiguous, respectively, with base 38, the upper end of which forms beveled shoulder 26, and with washer 40 on which the other beveled shoulder 24 is formed, so as to provide an entirely enclosed chamber within the shroud, by bolt 42 which may be used to mount the assembled tape guide at a given position relative to a mounting panel or other supporting means.

Since shroud 22 and shoulders 24 and 26 define concentric arcuate paths extending more than 180°, a tape may be curved in its movement direction any degree up through and including a U turn.

The air introduced through header inlet 34 is at a suitable pressure and rate of flow so as to cause any tape in contact with the porous shroud 22 to lift away from the shroud and be supported by the exuded uniformly pressured cushion or film of air. The rate of flow and pressure of the air supplied to the header is determined by the weight and tension of the tape to be supported and by a porosity of the shroud 22. Preferably, a sintered powdered bronze alloy such as "Oilite," a product made by the Chrysler Manufacturing Corporation and normally employed as an oil bearing material, is used for shroud 22. The porosity thereof is preferably approximately 20%, i.e., 20% of the volume is made up of orifices, but a greater or less porosity may be used with this invention in accordance with the pressure and flow rate of the air employed. Air at a pressure of approximately 20 p.s.i. and a rate of 1 c.f.m. per guide assembly has been found to be adequate for ½ inch wide tapes.

By controlled regulation of the pressure and flow of the air to any one or more of the tape guides 10 in FIGURE 3, improved braking and clutching techniques are made possible. That is, additional friction, when desired, can be obtained by reducing the air pressure applied to any or all of the air headers of the different tape guides to cause the tape to ride against the shroud. Thus it is apparent that there is provided by this invention apparatus in which the various objects and advantages herein set forth are successfully achieved.

Modifications of this invention not described herein will become apparent to those of ordinary skill in the art after reading this disclosure. Therefore, it is intended that the matter contained in the foregoing description and the accompanying drawings be interpreted as illustrative and not limitative, the scope of the invention being defined in the appended claims.

What is claimed is:

1. For use with a tape handling system, tape guiding apparatus comprising a base having a beveled shoulder, an air header having top and bottom sides, two ends, an inlet for pressurized air disposed in one of said ends and an air outlet communicating with said inlet, said bottom side being contiguous with said base shoulder, means having a beveled shoulder disposed contiguous to the header top side, an air pervious porous coherent powdered metal shroud attached to said header and extending between said beveled shoulders so as to form an enclosed chamber around said outlet for receiving air therefrom, said shroud having a given immediate resistance to the passage of air therethrough so as to cause pressurized air impinging on the interior surface thereof to spread over all said interior surface whereby air exuded from the exterior surface of said porous material forms an air cushion having a uniform pressure distribution and over which said tape may move in a substantially frictionless manner, said beveled shoulders being edge guides for said tape.

2. Apparatus as in claim 1 wherein said shroud is composed of a bronze alloy.

3. In a mechanical tape handling system including tape guiding means whereby the direction of travel of the tape is changed from a first direction to a second direction, the improvement in said tape guiding means comprising: means for forming a chamber having an inlet for receiving air under pressure, a given wall of said chamber being composed of air pervious porous material having a given immediate resistance to the passage of air therethrough to cause pressurized air entering via said inlet and impinging on the interior surface of said porous material to spread over all the interior surface thereof and exude from the exterior surface of said porous material as an air cushion having a uniform pressure distribution throughout the external area of said wall and on which cushion said tape may move in a substantially frictionless manner; means extending from said chamber forming means for mechanically guiding the edges of said tape; and means for mounting said chamber means with said porous material adjacent a movable tape.

4. Apparatus as in claim 3 wherein said porous material comprises a coherent powdered material.

References Cited in the file of this patent

UNITED STATES PATENTS

| | | |
|---|---|---|
| 2,612,552 | Anderson et al. | Sept. 30, 1952 |
| 2,645,534 | Becker | July 14, 1953 |
| 2,696,410 | Topanelian | Dec. 7, 1954 |
| 2,837,330 | Lawrance et al. | June 3, 1958 |
| 2,838,314 | Selsted | June 10, 1958 |
| 2,864,176 | Backlert et al. | Dec. 16, 1958 |
| 2,866,637 | Pendleton | Dec. 30, 1958 |
| 2,883,475 | Ridler et al. | Apr. 21, 1959 |
| 2,908,495 | Andrews et al. | Oct. 13, 1959 |